(No Model.)
G. W. GOODELL.
PROCESS OF BLOCKING ICE.
No. 286,604. Patented Oct. 16, 1883.
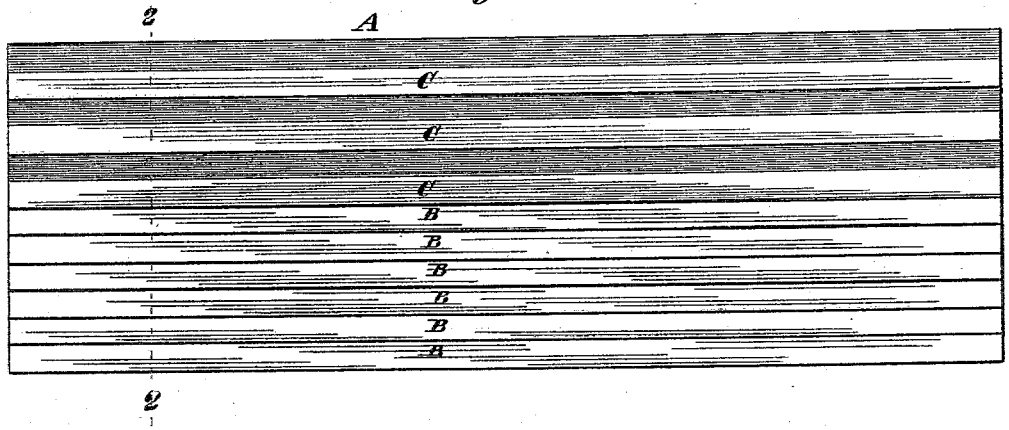
Attest:
Charles Pickle
Geo. L. Wheelock
Inventor:
Geo. W. Goodell
By Knight Bros
attys

UNITED STATES PATENT OFFICE.

GEORGE W. GOODELL, OF BEARDSTOWN, ILLINOIS.

PROCESS OF BLOCKING ICE.

SPECIFICATION forming part of Letters Patent No. 286,604, dated October 16, 1883.

Application filed September 8, 1883. (No model.)

*To all whom it may concern:*

Be it known that I, GEORGE W. GOODELL, of Beardstown, in the county of Cass and State of Illinois, have invented a certain new and useful Improvement in Processes of Blocking Ice, of which the following is a full, clear, and exact description, reference being had to the accompanying drawings, forming part of this specification, and in which—

Figure 1 is a top view of a cake or block of ice. Fig. 2 is a vertical section taken on line 2 2, Fig. 1. Fig. 3 represents a cake or block of ice after it has been grooved and forced beneath the field of ice. Fig. 4 is an enlarged view, illustrating my preferred manner of grooving or forming recesses in the ice. Fig. 5 illustrates one modified form of groove, which may vary widely.

My present invention relates to an improvement on the process of blocking ice shown and described in Letters Patent of the United States No. 275,192, granted to myself April 3, 1883, and reference is made to that patent for a full description of the process and its function.

This invention consists, broadly, in forming grooves or recesses in the cakes or blocks of ice, which are forced beneath the other ice for the purpose of allowing water to run in, which, freezing, more perfectly cements the pieces together, so that there will be no possibility of them coming apart.

Referring to the drawings, A represents a cake or block of ice of any desired size, which may be marked off by the usual plow, which forms slots or cuts B. After it is thus marked off grooves or recesses C are formed by means of a plane or otherwise, after which the cake should be scraped or swept to rid it of the loose ice, and it is then forced beneath the field of ice, as set forth in my patent mentioned above.

I have shown two forms of grooves or recesses in the ice, but do not confine myself to these or any other form, the essential feature of the invention being to make such recesses that will allow the influx of water, for the purpose stated.

I claim as my invention—

1. The herein-described process of blocking ice, consisting in placing two or more cakes or pieces together while in the water, and allowing them to adhere by freezing, one of the cakes being grooved or recessed, for the purpose set forth.

2. The herein-described process of blocking ice, consisting in forming grooves or recesses in a cake or block of ice, which is then forced beneath the field or section of ice, substantially as and for the purpose set forth.

GEORGE W. GOODELL.

In presence of—
THOS. H. CARTER,
CHARLES H. MEYER.